United States Patent
Li et al.

(10) Patent No.: US 8,732,613 B2
(45) Date of Patent: May 20, 2014

(54) DYNAMIC USER INTERFACE FOR NAVIGATING AMONG GUI ELEMENTS

(75) Inventors: Yang Li, Palo Alto, CA (US); Zhiwei Guan, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/605,851

(22) Filed: Sep. 6, 2012

(65) Prior Publication Data
US 2014/0068475 A1    Mar. 6, 2014

(51) Int. Cl.
*G06F 3/048* (2013.01)

(52) U.S. Cl.
USPC ............. 715/833; 715/765; 715/863

(58) Field of Classification Search
USPC .......... 715/765, 788, 798, 830, 833, 863
See application file for complete search history.

(56) References Cited

U.S. PATENT DOCUMENTS

| | | | |
|---|---|---|---|
| 5,736,974 A | 4/1998 | Selker | |
| 7,523,409 B2 | 4/2009 | Yolleck et al. | |
| 7,574,669 B1 * | 8/2009 | Braun et al. | 715/777 |
| 2002/0113823 A1 | 8/2002 | Card et al. | |
| 2005/0210403 A1 * | 9/2005 | Satanek | 715/786 |
| 2007/0288860 A1 | 12/2007 | Ording et al. | |
| 2008/0141161 A1 * | 6/2008 | Raven et al. | 715/777 |
| 2009/0319949 A1 * | 12/2009 | Dowdy et al. | 715/814 |
| 2010/0070928 A1 | 3/2010 | Goodger et al. | |
| 2011/0057957 A1 | 3/2011 | Kasahara | |
| 2012/0023427 A1 * | 1/2012 | Ording et al. | 715/769 |
| 2012/0233566 A1 * | 9/2012 | Mandic et al. | 715/777 |

FOREIGN PATENT DOCUMENTS

WO    92/08199 A1    5/1992

OTHER PUBLICATIONS

"What makes Camino special?", The Camino Project [online]. First accessed on Nov. 13, 2011. Retrieved from the Internet: <http://caminobrowser.org/features/> 5 pgs.
"Arrange tabs", Google Chrome [online]. First accessed on Nov. 13, 2011. Retrieved from the Internet: <http://www.google.com/support/chrome/bin/answer.py?answer=95622> 2 pgs.

(Continued)

*Primary Examiner* — Steven Sax
*Assistant Examiner* — Christopher J Fibbi
(74) *Attorney, Agent, or Firm* — Shumaker & Sieffert, P.A.

(57) ABSTRACT

In one example, a computing device executes a plurality of application processes, each of which has an associated graphical user interface element. The computing device renders a common graphical user interface on a presence-sensitive screen. The common graphical user interface includes a currently rendered graphical user interface element associated with a currently selected application process from among the plurality of application processes; a tab row comprising a plurality of tabs, wherein each of the graphical user interface elements corresponds to one of the plurality of tabs; and a slide bar positioned proximate to the tab row. The computing device renders a first tab in the tab row with a larger size than other graphical tabs in the plurality of tabs responsive to receipt by the presence-sensitive screen of a gesture input associated with a region of the slide bar that is closest to the first tab.

16 Claims, 9 Drawing Sheets

(56) References Cited

OTHER PUBLICATIONS

"Tab width CSS property", stackoverflow [online]. First accessed on Nov. 13, 2011. Retrieved from the Internet: <http://stackoverflow.com/questions/6754733/tab-width-css-property> 2 pgs.

"Bug 52994—WebKit should support tab-size", WebKit Bugzilla [online]. First accessed on Nov. 13, 2011. Retrieved from the Internet:<https://bugs.webkit.org/show_bug.cgi?id=52994> 8 pgs.

Gottwald, "Cutom Tab Width", Mozilla Add-Ons [online]. First accessed on Nov. 13, 2011. Retrieved from the Internet:<https://addons.mozilla.org/en-US/firefox/addon/custom-tab-width/> 3 pgs.

Takayama, "Faviconize Tab", Mozilla Add-Ons [online]. First accessed on Nov. 13, 2011. Retrieved from the Internet:<https://addons.mozilla.org/en-US/firefox/addon/faviconizetab/> 3 pgs.

Piro, "Tree Style Tab", Mozilla Add-Ons [online]. First accessed on Nov. 13, 2011. Retrieved from the Internet: <https://addons.mozilla.org/en-US/firefox/addon/tree-style-tab/> 3 pgs.

International Search Report and Written Opinion from corresponding PCT Application No. PCT/US2013/058250, mailed Feb. 6, 2014, 12 pages.

\* cited by examiner

DYNAMIC USER INTERFACE FOR NAVIGATING AMONG GUI ELEMENTS

BACKGROUND

Computing devices may have multiple applications, pages, or instances running at the same time and available for a user to interact with. Alternatively, a computing device may quickly close and open various applications, pages, or instances as a user opts to stop using one and start using another one. In either case, the computing device may render a graphical user interface (GUI) at a display, and render individual GUI elements, such as tabs or icons, corresponding to each of the applications, pages, or instances that may be currently running or that may be available for a user to access. A user may select a particular one of the tabs or icons by entering a user input, such as a touch input or a mouse click, to navigate to or to open the corresponding application, pages, or instances, for example.

SUMMARY

In general, this disclosure provides a dynamic user interface for navigating among graphical user interface (GUI) elements.

In one example, a method includes executing, by a computing device, a plurality of application processes, wherein each of the application processes has an associated graphical user interface element. The method further includes rendering, by the computing device, a common graphical user interface on a presence-sensitive screen of the computing device. The common graphical user interface includes a currently rendered graphical user interface element that is associated with a currently selected application process from among the plurality of application processes; a tab row comprising a plurality of graphical tabs, wherein each of the graphical user interface elements corresponds to one of the plurality of graphical tabs; and a slide bar positioned proximate to the tab row. The method further includes rendering a first graphical tab in the tab row with a larger size than other graphical tabs in the plurality of graphical tabs responsive to receipt by the presence-sensitive screen of a gesture input associated with a region of the slide bar that is closest to the first graphical tab.

In another example, a computing device includes at least one processor, a presence-sensitive screen, and machine-readable code stored on the at least one data storage device. The machine-readable code comprising executable instructions that are executable by the at least one processor, thereby configuring the at least one processor to execute a plurality of application processes, wherein each of the application processes has an associated graphical user interface element. The executable instructions further configure the at least one processor to render a common graphical user interface on the presence-sensitive screen of the computing device. The common graphical user interface includes a currently rendered graphical user interface element that is associated with a currently selected application process from among the plurality of application processes; a tab row comprising a plurality of graphical tabs, wherein each of the graphical user interface elements corresponds to one of the plurality of graphical tabs; and a slide bar positioned proximate to the tab row. The executable instructions further configure the at least one processor to render a first graphical tab in the tab row with a larger size than other graphical tabs in the plurality of graphical tabs responsive to receipt by the presence-sensitive screen of a gesture input associated with a region of the slide bar that is closest to the first graphical tab.

In another example, a computer-readable storage medium includes executable instructions for configuring at least one processor to execute a plurality of application processes, wherein each of the application processes has an associated graphical user interface element. The executable instructions further configure the at least one processor to render a common graphical user interface on the presence-sensitive screen of the computing device. The common graphical user interface includes a currently rendered graphical user interface element that is associated with a currently selected application process from among the plurality of application processes; a tab row comprising a plurality of graphical tabs, wherein each of the graphical user interface elements corresponds to one of the plurality of graphical tabs; and a slide bar positioned proximate to the tab row. The executable instructions further configure the at least one processor to render a first graphical tab in the tab row with a larger size than other graphical tabs in the plurality of graphical tabs responsive to receipt by the presence-sensitive screen of a gesture input associated with a region of the slide bar that is closest to the first graphical tab.

The details of one or more embodiments are set forth in the accompanying drawings and the description below. Other features, objects, and advantages will be apparent from the description and drawings, and from the claims.

The various described features are not drawn to scale and are drawn in a simplified form in which one or more features

DETAILED DESCRIPTION

In general, the disclosure below is directed to methods, devices, and software for dynamic controls for navigating among multiple browser tabs, windows, or applications/apps, which may be collectively referred to as application processes, in a graphical user interface (GUI) on a computing device such as a smartphone, tablet computer, or other computer or computing interface. Dynamic navigation features may be used on a computing device that has a touchscreen or other type of presence-sensitive display. Dynamic navigation features of this disclosure may include a slide bar graphical element rendered adjacent or proximate to a row of graphical navigation tabs or browsing tabs, i.e. graphical tabs, where each graphical tab is associated with a different page, window, application, or other application process, whether of a browser application or other application. The slide bar graphical element, i.e. slide bar, enables a user to make gesture inputs to navigate among the tabs and dynamically adjust the sizes of tabs proximate to the gesture input in the slide bar. The sizing of the tabs may therefore be made to differ dependent on user interactions with the slide bar. The sizing of the tabs may also be dependent on which tab is currently open or on which application process is currently selected for viewing. When several tabs are open and the user is not interacting with the slide bar, the tab for the currently open process may be sized relatively larger, or magnified, while the other tabs for application processes not currently open may be sized relatively smaller, or demagnified, in various examples.

Tabs adjacent to the tab for the currently open process may also be rendered in an intermediate size, in various examples. The amount of content displayed in a tab may be dependent on the tab's current size, so the tab for a currently open application process may be large enough to show a significant amount of the title text adjacent to the icon, while a demagnified tab may only display an icon or may display nothing other than the outline of the tab itself, for example. Other specific sizing characteristics may be used depending on the number of open tabs, the screen width, the pixel resolution, if the device is in a portrait mode or a landscape mode, and whether the tabs are constrained to all be represented within the width of the screen or are allowed to run off the edges of the screen, in different examples. An example of a GUI implementing dynamic navigation features is shown in FIG. 1.

Figure 1:
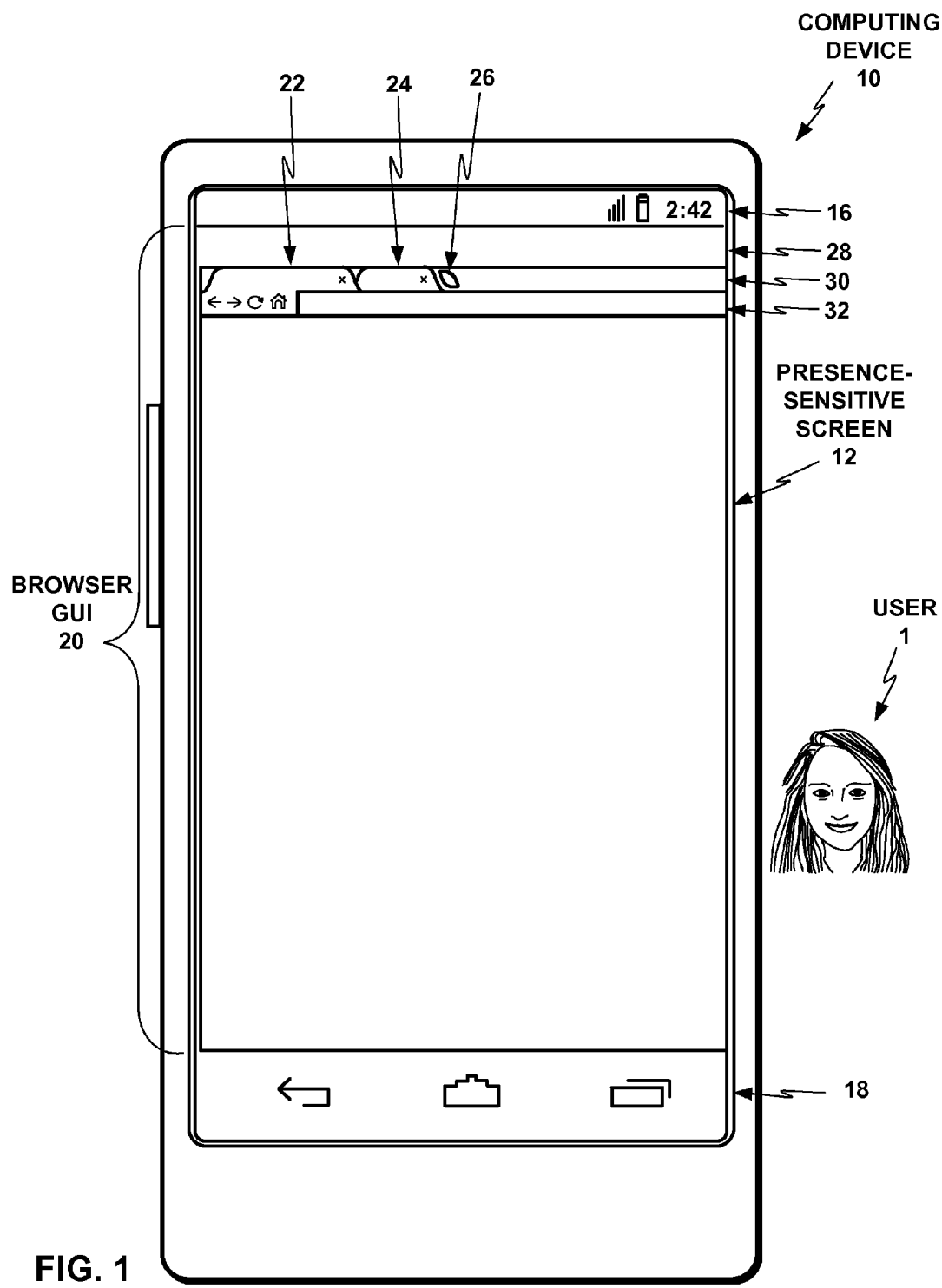
FIG. 1 is a schematic diagram illustrating an example smartphone computing device configured with example GUI navigation features in accordance with aspects of the present disclosure.

FIG. 1 is a block diagram illustrating an example of a computing device 10 configured to execute one or more applications in accordance with one or more aspects of the present disclosure. As shown in the example of FIG. 1, computing device 10 is a smartphone with a presence-sensitive screen 12, on which device 10 renders a user interface, and at which device 10 may receive user gesture inputs, such as touch gesture inputs on presence-sensitive screen 12. Computing device 10 is illustratively depicted operating a browser application that renders a browser graphical user interface (GUI) 20 on presence-sensitive screen 12, as well as additional GUI features such as information bar 16 and navigation bar 18.

Other computing devices may also be used in some examples, including portable computing devices such as a mobile phone, a tablet computer, a laptop, a netbook, or a wearable device, as well as more or less stationary computing devices such as a desktop computer or a fixed interface panel, for example. Computing device 10 may also connect to a wired or wireless network using a network interface. Additional details of example computing devices are described in further detail below with respect to subsequent figures.

Computing device 10 includes one or more input devices that receive user input, such as from illustratively depicted user 1, specifying actions to be performed by computing device 10. In the illustrated example, presence-sensitive screen 12 is both an input device and an output device that generates one or more signals corresponding to a location selected by a gesture input performed by the user 1 on or near the presence-sensitive screen 12. In some examples, presence-sensitive screen 12 detects a presence of an input unit, e.g., one or more fingers, a pen, or a stylus, that may come in contact with presence-sensitive screen 12, or that may be proximate to but not in physical contact with presence-sensitive screen 12. As used herein, user "contact" may therefore refer to a proximate presence that is detected by presence-sensitive screen 12. In other examples, the gesture may include physical contact with presence-sensitive screen 12 to select the corresponding location, e.g., in the case of a touch-sensitive screen. Presence-sensitive screen 12, in some examples, generates a signal corresponding to the location of the input unit. Signals generated by the selection of the corresponding location(s) may be provided as data to applications, e.g., the browser application that renders browser GUI 20, and other components of computing device 10. One or more intermediary applications or operating system components of computing device 10 may also filter or process the signals generated via presence-sensitive screen 12 before conveying filtered or processed input signals to the browser application or another one or more applications.

In some examples, computing device 10 may include an input device such as a joystick, camera, acoustic sensor, or other device capable of receiving or recognizing a gesture of user 1. In one example, a camera capable of transmitting user input information to computing device 10 may visually identify a gesture performed by user 1. Upon visually identifying the gesture of the user, a corresponding user input may be received by computing device 10 from the camera. In another example, one or more acoustic sensors may identify mechanical vibrations or other acoustic signals that a user may make with gestures such as tapping or otherwise contacting or manipulating a surface or object, and computing device 10 may interpret the acoustic signals as user inputs. The aforementioned examples of input devices are provided for illustration purposes. Other similar example techniques may also be suitable to detect a gesture and detected properties of a gesture.

Computing device 10 also includes one or more output devices that display content to user 1. In the illustrated example, presence-sensitive screen 12 of computing device 10 displays graphical content responsive to electronic signaling or other directives from computing device 10. Graphical content, generally, may include any visual depiction displayed by presence-sensitive screen 10. Examples of graphical content may include images, text, videos, visual objects, and/or visual program components such as scroll bars, text boxes, buttons, etc. In the illustrated example, the browser application directs presence-sensitive screen 12 to display browser graphical user interface (i.e., browser GUI) 20. In this example, the operating system and/or other applications also direct presence-sensitive screen 12 to display additional GUI features, including information bar 16 and navigation bar 18. Information bar 16 may display information such as the time, signal bars indicating wireless signal strength, and notifications from email and texting applications, in this example. Navigation bar 18 includes virtual navigation buttons, such as buttons for going back, for going to the home screen, and for switching between applications, for example.

The browser application behind browser GUI 20 executing on computing device 10 includes program instructions and/or data that are executable by computing device 10. Many types of applications may run on computing device 10, examples of which may include a web browser, an email application, a text messaging application, or any other application that receives user input and/or displays graphical content.

The browser application causes browser GUI 20 to be displayed by presence-sensitive screen 12. Browser GUI 20 may include interactive and/or non-interactive graphical content that presents information of computing device 10 in human-readable form. Browser GUI 20 enables user 1 to interact with the browser application through presence-sensitive screen 12. In this way, browser GUI 20 may enable user 1 to create, modify, and/or delete data on computing device 10.

User 1 may perform gestures on browser GUI 20 in presence-sensitive screen 12, e.g., tapping virtual buttons or keys displayed at regions of presence-sensitive screen 12 that provide input to the browser application. Elements of the operating system and/or the browser application may process gesture inputs to presence-sensitive screen 12, including inputs to virtual buttons or keys, and the browser application (or other application) may provide outputs and change the state of browser GUI 20 in response to the user inputs. In this example, the browser application supports tabbed browsing, with multiple browser windows that a user can access with tabs, such as tabs 22, 24, with one tab for each browser window, such that a user can select one of the tabs to cause the browser application to render the browser window corresponding to that tab in browser GUI 20. Each browser window may be rendered by a separate application process of the browser application, in one example implementation. Different browser applications and other applications or other application processes (which may be referred to collectively and generically as application processes) may implement tabbed browsing or tabbed navigation in a variety of ways, such as with multiple threads or with single-threaded tabbed browsing, with separate tabs or other graphical elements that each correspond to a window or other element. Such tabs or other graphical elements may be generically referred to as graphical user interface elements or process graphical user interface elements for purposes of this disclosure, e.g., graphical user interface elements associated with application processes. Each of one or more application processes may have an associated graphical user interface element, e.g., each application process of a browser application may have an associated tab that is a graphical user interface element associated with that application process).

As seen in FIG. 1, the browser application may also render the tabs 22, 24 in different sizes. Tab 22, which corresponds to the currently rendered or top browser window or application process, is rendered in a larger size than tab 24, which corresponds to a currently non-rendered browser window or application process, which is not currently rendered and may be conceptualized in the user experience as being currently below or obscured by the currently rendered or top browser window. Tab 22 for the current browser window is rendered in a larger size, or magnified, relative to tab 24, which is rendered in a smaller size, or demagnified, since it is associated with the currently non-selected browser window. Tab row 30 also includes a new tab button 26 which may be selected for opening a new browser window and associated tab. As the user opens new tabs, the function of magnifying and demagnifying tabs as rendered in tab row 30 may also be extended in a variety of ways to more than two tabs, as further described below.

The tabs 22, 24 display useful identifying information about their corresponding browser windows or other application processes, such as an identifying icon and a page title, that are useful for the user to see when navigating among the tabs. While tab 24 is shown in a moderately demagnified state in the example of FIG. 1, it still has enough space to show an icon and a useful portion of the beginning of the page title.

Browser GUI 20 also includes a URL box 32 (or omnibox 32) adjacent to tab row 30, and a slide bar 28 adjacent to tab row 30, in the example of FIG. 1. When a user touches the slide bar 28 and runs a finger in a gesture motion along the slide bar 28, the tab magnification may follow the user's finger, so that the tab immediately adjacent to the current user touch or that is indicated by the current user gesture is magnified instead of the tab for the currently open process, wherever the user gesture input goes along the slide bar 28. That is, computing device 10 may render a first graphical tab in tab row 30 with a larger size than the other graphical tabs in the plurality of graphical tabs in tab row 30, responsive to receipt by presence-sensitive screen 12 of a gesture input associated with the region of slide bar 28 that is closest to the first graphical tab. Computing device 10 may then render additional graphical tabs in tab row 30 with relatively larger sizes than the other graphical tabs in tab row 30, responsive to receipt by presence-sensitive screen 12 of ongoing motion of a gesture input associated with the region of slide bar 28 while the gesture input moves closer to the additional graphical tabs. Thereby, computing device 10 may modify the tab magnification, rendering the graphical tabs in tab row 30 with varying size, responsive to receipt by presence-sensitive screen 12 of user gesture inputs associated with regions of slide bar 28. Examples of this are shown in FIGS. 2-4.

Figure 2:
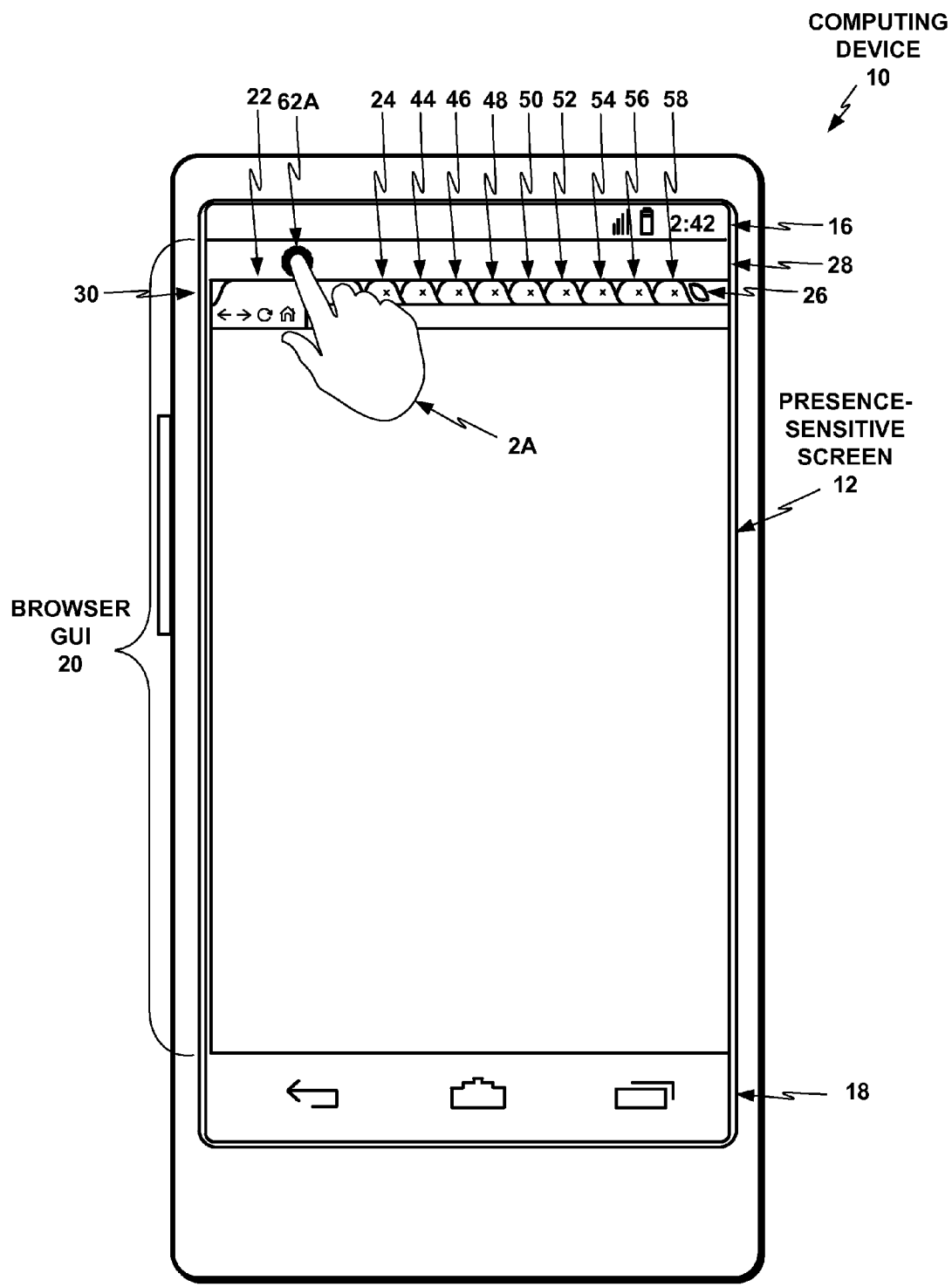
FIG. 2 is a schematic diagram illustrating an example smartphone computing device configured with additional example GUI navigation features in accordance with aspects of the present disclosure.

FIG. 2 shows browser GUI 20 rendered on presence-sensitive screen 12 of computing device 10 with tabs 22 and 24 still open, and with additional tabs 44, 46, 48, 50, 52, 54, 56, 58 also open now. As seen in FIG. 2, with the tabs compressed to remain on screen within tab row 30, the multitude of tabs now open in tab row 30 now make it difficult if not impossible to display any useful information in all of the tabs. This issue becomes more important with smaller screen sizes, so that it becomes an issue more rapidly on a tablet computing device than on a desktop or laptop computing device, and all the more rapidly on a smartphone computing device, a wearable computing device, or other highly mobile computing device with a relatively small screen.

FIG. 2 also shows the user's hand 2A, with the user making a gesture input with a point of contact 62A (or point of indication 62A for a non-touch gesture input) in slide bar 28, adjacent to the currently selected tab 22. FIG. 3 shows the user moving her hand 2A from a first position (shown at 2A) to position 2B, and sliding the point of contact or point of indication on slide bar 28 from its initial point of contact 62A to a subsequent point of contact 62B. As the user slides her point of contact along the slide bar 28, each time the user's point of contact leaves the immediate vicinity of one tab and comes adjacent to the next tab in tab row 30, the tab that it is leaving becomes demagnified, and the tab that it is coming adjacent to is magnified, in this example.

Figure 3:
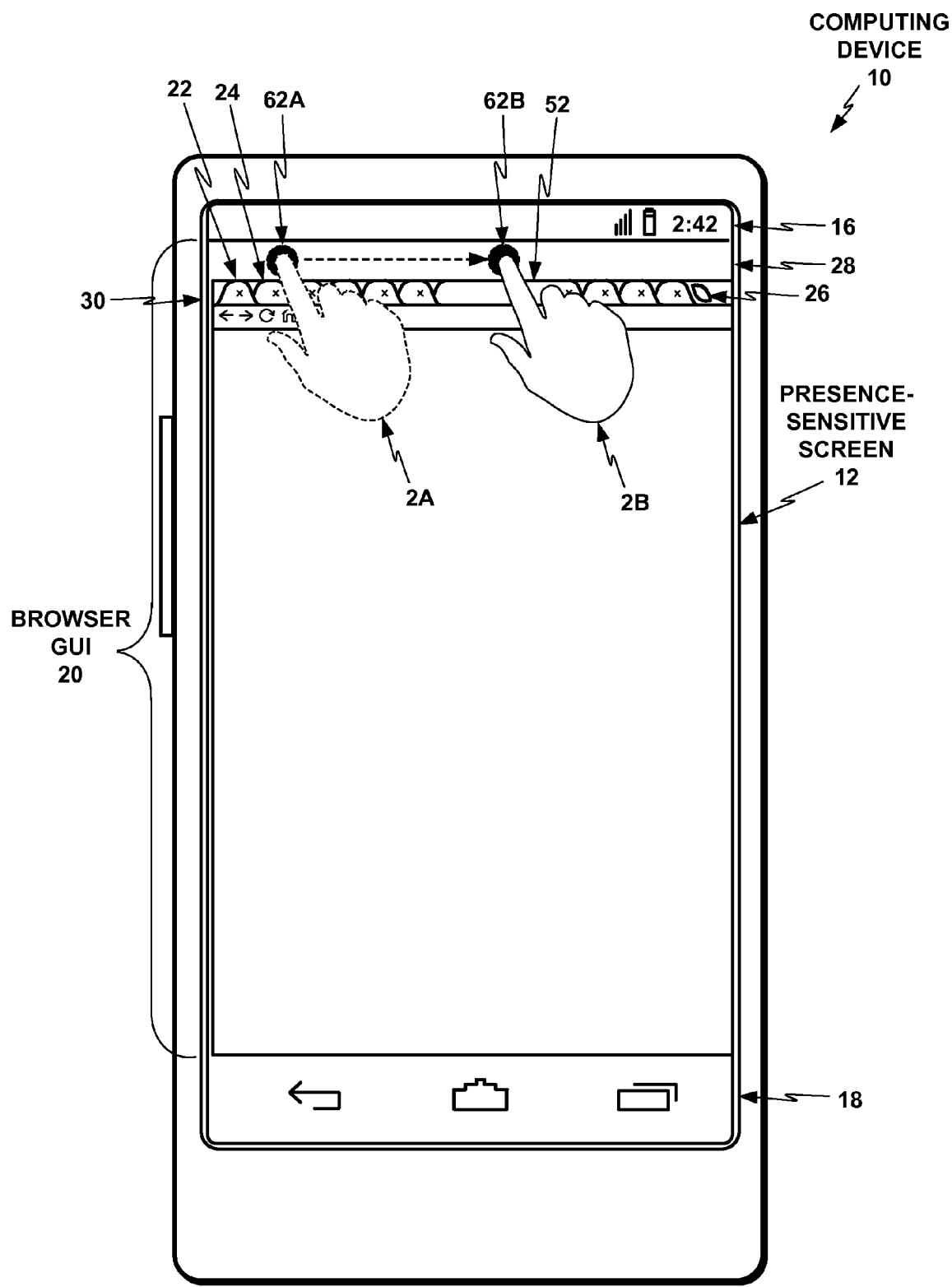
FIG. 3 is a schematic diagram illustrating an example smartphone computing device configured with additional example GUI navigation features in accordance with aspects of the present disclosure.
Figure 4:
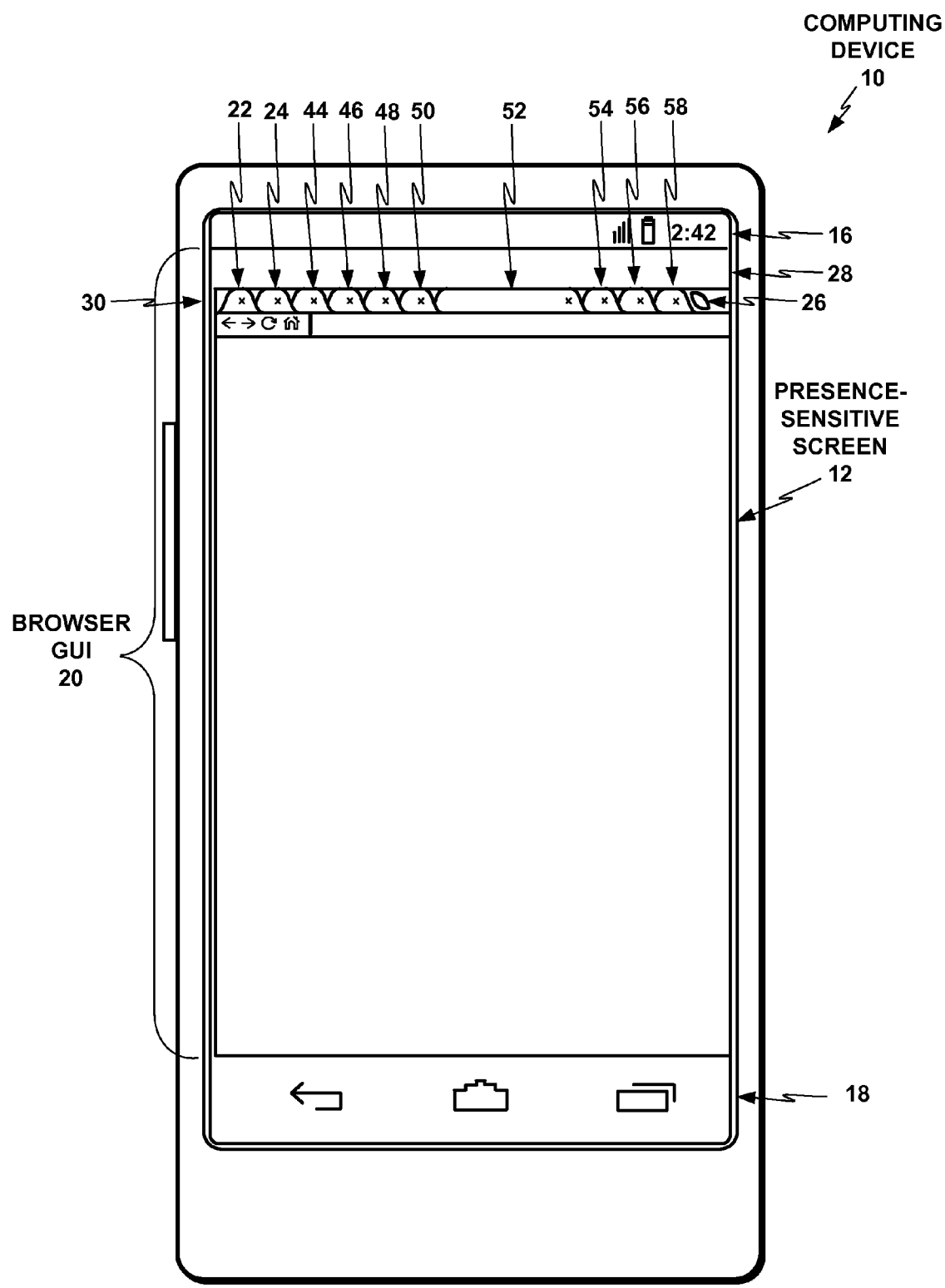
FIG. 4 is a schematic diagram illustrating an example smartphone computing device configured with additional example GUI navigation features in accordance with aspects of the present disclosure.

So, while tab 22 was originally magnified at the start of the process, as shown in FIGS. 1 and 2, tab 22 is demagnified in the view of FIG. 3; and while tab 52 was one of many demagnified tabs in the view of FIG. 2, tab 52 is magnified to the larger size in the view of FIG. 3, where it is immediately adjacent the current point of contact 62B of the user gesture input. Each of the intervening tabs between tab 22 and tab 52 may also have been magnified and then demagnified in sequence during the progress of the user gesture input along the path from the initial point of contact 62A to the point of contact 62B shown in FIG. 3. This magnification of each tab as the user drags the gesture input adjacent to each tab in the slide bar 28 enables the user to see the full-size identifying information, such as icon and page title, in each tab, and for as long as the user keeps the gesture input adjacent to that tab. This process of magnifying and demagnifying the tab sizes in response to the gesture input therefore enables much more informed and useful navigation among the tabs, particularly on devices with small screens, or a small size for presence-sensitive screen 12.

The user may then complete the gesture input, once the user has selected a tab, and lift her hand away from presence-sensitive screen 12, or finalize the gesture input in examples based on non-contact gesture inputs, so that point of contact 62B is the final point of contact, and tab 52 remains magnified while the other tabs remain demagnified after the end of the gesture input. In some examples, the browser application then switches from rendering the browser window for tab 22 to rendering the browser window for tab 52, once the user gesture input is released, or once a user input is made that otherwise indicates a user navigation to the browser window for that tab. In other examples, the browser application may also display an expanded tab or other graphical preview for each tab that the user gesture input navigates adjacent to along the path from the initial point of indication to the final point of indication in the slide bar 28.

Figure 5:
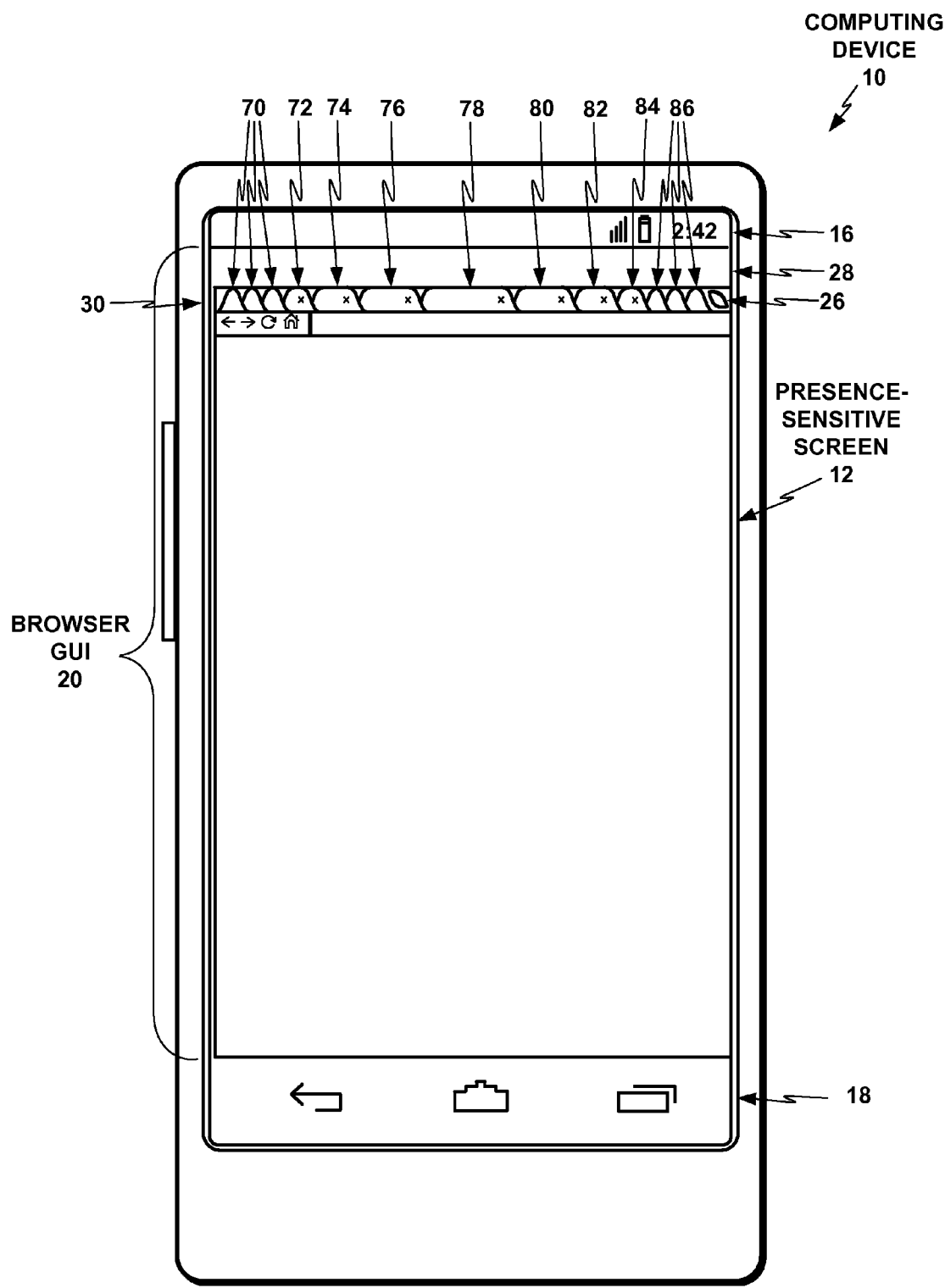
FIG. 5 is a schematic diagram illustrating an example smartphone computing device configured with additional example GUI navigation features in accordance with aspects of the present disclosure.

The browser application may also render the demagnified tabs in a range of magnifications. FIG. 5 shows one example of this, in which the browser application renders the demagnified tabs in various levels of magnification at the same time, with currently selected tab 78 magnified, and an intermediate level of magnification proximate to the currently magnified tab 78, with a descending order of magnification with increasing distance from the currently magnified tab, down to a minimal size for the tabs at a certain tab count distance away from the currently magnified tab. So, tabs 76 and 80 are slightly demagnified since they are adjacent to currently selected tab 78, then tabs 74 and 82 are rendered in a further demagnified state, tabs 72 and 84 are yet further demagnified, and tabs 70 and 86 are maximally demagnified, corresponding to their respective distance from the currently selected tab 78. If intermediate sizes adjacent to the magnified tab are used, the intermediate magnification may also continue preceding and following the main magnification as a gesture input is dragged along the slide bar. This pattern of graduated demagnification of the tabs surrounding the currently selected or currently proximate tab may therefore be applied during the process of a user gesture input along slide bar 28, so that a subset of partially magnified tabs are dynamically magnified and demagnified in a moving range surrounding the current position of the user gesture input, so that the amount of information the user can see from the surrounding tabs is proportional to the proximity of the user gesture input. The magnified and demagnified tabs make it easier for the user to see the title for each tab as the user scrolls a finger along the slide bar, thereby facilitating navigation among tabs, particularly on a screen with a relatively small size. This may therefore provide additional advantage for informing and facilitating the user's navigation among the tabs.

The magnified tabs may be magnified in a continuously variable manner dependent on the relative position of the contact point of a user's gesture input with respect to the adjacent tabs. For example, the graphical tab currently rendered with a magnified or larger size may be rendered in a maximum size when the gesture input is closest to the center of the tab, and decrease continuously in size as the gesture input moves toward the edge of the tab. Another tab proximate to the largest magnified tab may also be rendered in an intermediate size that increases continuously in size as the gesture input moves closer to this proximate tab, so that the proximate tab increases in size and the previously adjacent tab decreases in size such that they are the same size when the gesture input is exactly between them, and equally proximate to them both.

Therefore, in the example of FIG. 5, computing device 10, responsive to receipt of a gesture input by the portion of presence-sensitive screen 12 on which tab row 30 is rendered while graphical tab 78, which is closest to the gesture input, is rendered with a larger size than graphical tabs for other graphical user interface elements, graphical tabs 76 and 80 that are adjacent to graphical tab 78 are rendered in an intermediate size. That is, this intermediate size is smaller than the larger size of graphical tab 78, and larger than a size for graphical tabs 70, 86 for other graphical user interface elements that are not adjacent to graphical tab 78. This is further applicable to graphical tabs 74 and 82, which are adjacent to the first intermediate-sized tabs 76 and 80 and proximate to graphical tab 78, and which are rendered in a smaller intermediate size that are still larger than the size for graphical tabs 70, 86, in this example. An additional repetition of this pattern is applied to graphical tabs 72 and 84, which are adjacent to the second intermediate-sized tabs 74 and 82 and somewhat proximate to graphical tab 78, and which are rendered in a yet smaller intermediate size that are also still larger than the size for graphical tabs 70, 86, in this example.

In another example, no differential or special sizing can be applied when the user is not navigating, and the magnified and demagnified tabs are only used when the user touches or makes a gesture input to the slide bar to navigate among the open tabs.

Figure 6:
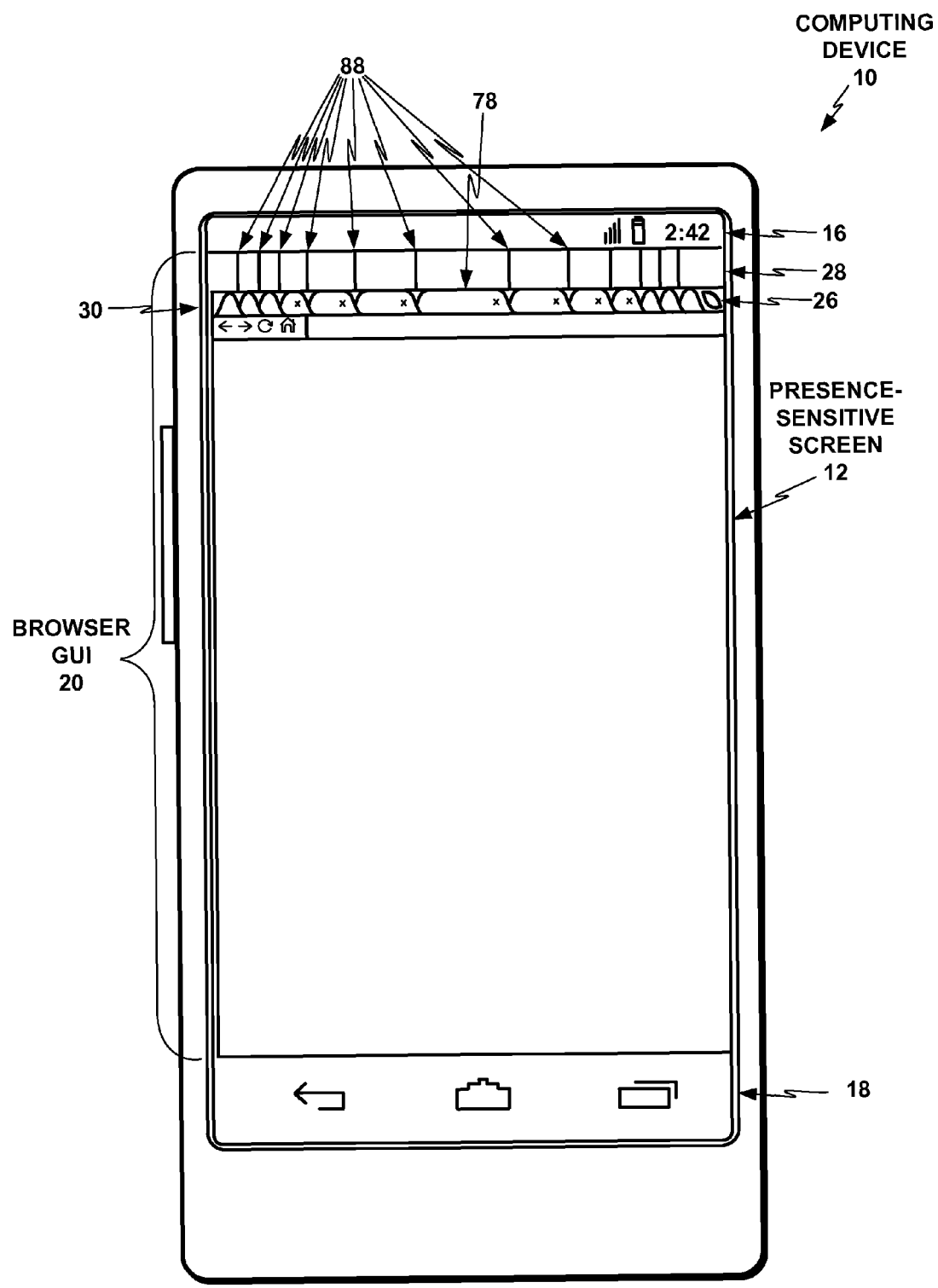
FIG. 6 is a schematic diagram illustrating an example smartphone computing device configured with additional example GUI navigation features in accordance with aspects of the present disclosure.

FIG. 6 shows another example in which the browser application may render tab edge lines 88 in the slide bar 28, with a vertical line positioned adjacent to each edge between two adjacent tabs in tab row 30. The tab edge lines 88 may serve as indicators of the clustering density of the tabs in tab row 30, with the tab edge lines 88 spaced relatively far apart adjacent to the edges of the currently selected tab 78 or currently active tab 78, whereas the other tab edge lines 88 are clustered more densely, to show the proportional clustering of the other tabs in tab row 30.

The slide bar 28 may therefore be conceptualized with a user interaction metaphor of an elastic band, that is stretched at the point of the user touch, and that stretches the edges of the adjacent tab to show more information at the point of the user touch.

In another example, which may be referred to as a run-off option, the row of tabs may be allowed to run off the edges of the screen, rather than be constrained to fit within the screen width as depicted in the previous examples. In either of these examples, as the user opens more tabs so that they don't all fit at full width within the edges of the screen, the non-focus tabs (i.e. the tabs for the processes/windows not currently active) may have their width steadily reduced. In the run-off option, the tab width can be constrained to a certain minimum width, such as just enough width to display the tab's icon, and as additional tabs are opened after the minimum tab width has already been reached, the tab row becomes extended off the edge of the screen.

As one particular example, the browser application may impose a minimum tab width of seven millimeters, or some other minimum tab width somewhere in the range of five to twelve millimeters, or another value outside that range, but that is selected to maintain the tabs at a size that each one may still be easily selectable by a user gesture input, as appropriate to the form of user gesture inputs that are accepted for that device. For example, in devices that primarily use user touch gesture inputs with the user's finger, a minimum size may be selected that remains easily selectable with a human finger, which may be seven millimeters, in one example. In other devices that may accept a user gesture input with a fine-tipped stylus, the browser application may maintain a smaller minimum tab width, such as three millimeters, for example. In devices that use a camera and eye tracking of the user's eyes for accepting user gesture inputs, the browser application may maintain a relatively smaller minimum tab width, such as three millimeters, for example. A browser application may also alternate between various gesture input modes and different minimum tab widths on a single device where multiple user gesture input modes may be used on that device.

When the user is done scrolling through the tabs, the user can decide to select the current magnified tab, or still stay on the currently open process/window. Different user interaction options can be used to select between these two choices. For example, the user may tap on a currently magnified tab to open the process/window for that tab, or simply remove the finger from the screen to release the currently magnified tab and stay on the currently open process/window.

While the slide bar 28 is depicted as being rendered above the tab row 30 and the URL box 32 in the previous examples, other examples may also use other arrangements, such as positioning the slide bar 28 below the tab row 30. In yet another example, the functionality of the slide bar 28 may be superimposed on the tab row 30, and the browser application may interpret different forms of gesture input on the combined tab row/slide bar as inputs for selecting a tab or for sliding along the tab row to progressively magnify and demagnify the tabs and to navigate among the tabs. In other examples, a browser application may render a button or scroll bar (not depicted) in the slide bar 28, and follow a user interface metaphor of a user gesture input to the slide bar 28 corresponding to a grasp-and-drag input to the button or scroll bar, which may represent a more intuitive user experience for some users. Any or all of the different examples and options disclosed herein may be either selected and implemented by the developer ahead of time as an enforced implementation, or may be offered as user-configurable options that the user is free to modify. In the latter case, one implementation may be configured as the initial or default configuration, and the other options may be made available for the user to select to modify the user interface away from the initial default setting.

Figure 7:
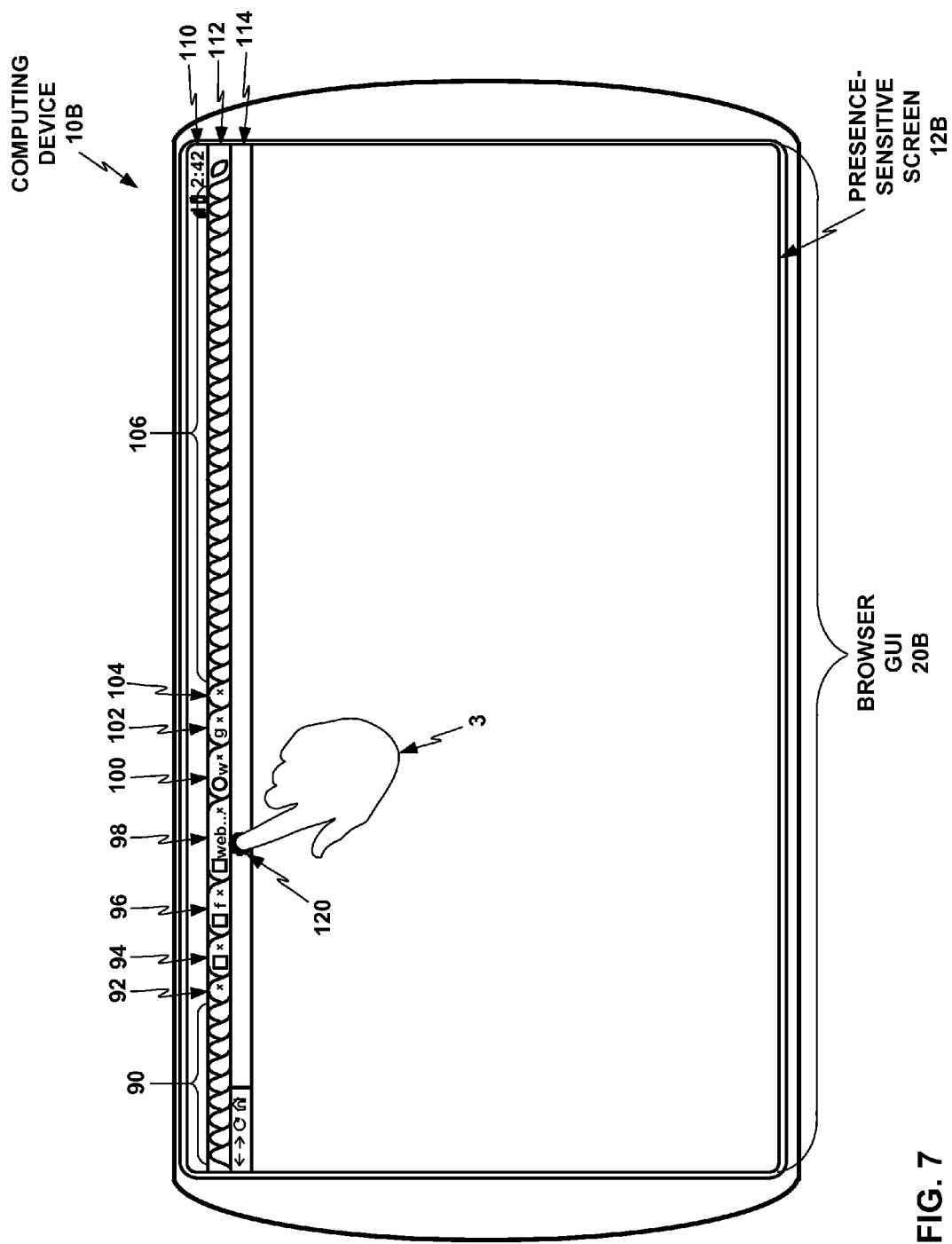
FIG. 7 is a schematic diagram illustrating an example tablet computing device configured with additional example GUI navigation features in accordance with aspects of the present disclosure.

FIG. 7 depicts a schematic diagram illustrating an example tablet computing device 10B configured with additional example GUI navigation features in accordance with aspects of the present disclosure. As with the smartphone computing device 10 depicted in FIGS. 1-6, tablet computing device 10B has a presence-sensitive screen 12B on which a browser application renders a browser GUI 20B. Browser GUI 20B includes an information bar 110, a tab bar 112, and a URL box 114. A user currently has tabs 90-106 open in the tab bar 112. In this example, the browser application operates the functions of a slide bar as described above superimposed on the URL box 114. The user's hand 3 is depicted entering user gesture inputs on the URL box/slide bar 114, with a current point of gesture input 120, which may be a point of user contact or point of gesture input in the case of non-contact examples. The currently selected tab 98 is adjacent to the current point of gesture input 120. The tabs are shown rendered such that tabs 92, 94, 96, 100, 102, and 104 are progressively partially magnified as a function of their proximity to currently selected tab 98, while tabs 90 and 106 that are more distant from the currently selected tab 98 are fully demagnified. As FIG. 7 shows, the currently magnified tab 98 shows identifying information in the form of an icon and the beginning of a page title, while partially magnified tabs 96 and 100 display an icon and the very beginning of a page title, tabs 94 and 102 are magnified just enough to show an identifying icon, and tabs 90, 92, 104, and 106 are too demagnified to display any identifying information. The magnification of the tab 98 immediately adjacent to the contact point 120 of the current user gesture input (which may be considered the in-focus tab), and the partial magnification of the tabs 94, 96, 100, and 102 surrounding the currently in-focus tab 98, therefore facilitate and inform user navigation even among a very high number of open tabs.

While examples are shown above with both smartphone and tablet computing devices formats, other examples may be implemented on any other type of computing device. A browser application, or other application or user interface involving multiple applications, may therefore use any of the techniques disclosed above to empower a user to navigate among various tabbed browser windows, tabbed application processes, or tabbed information spaces rapidly and efficiently.

Figure 8:
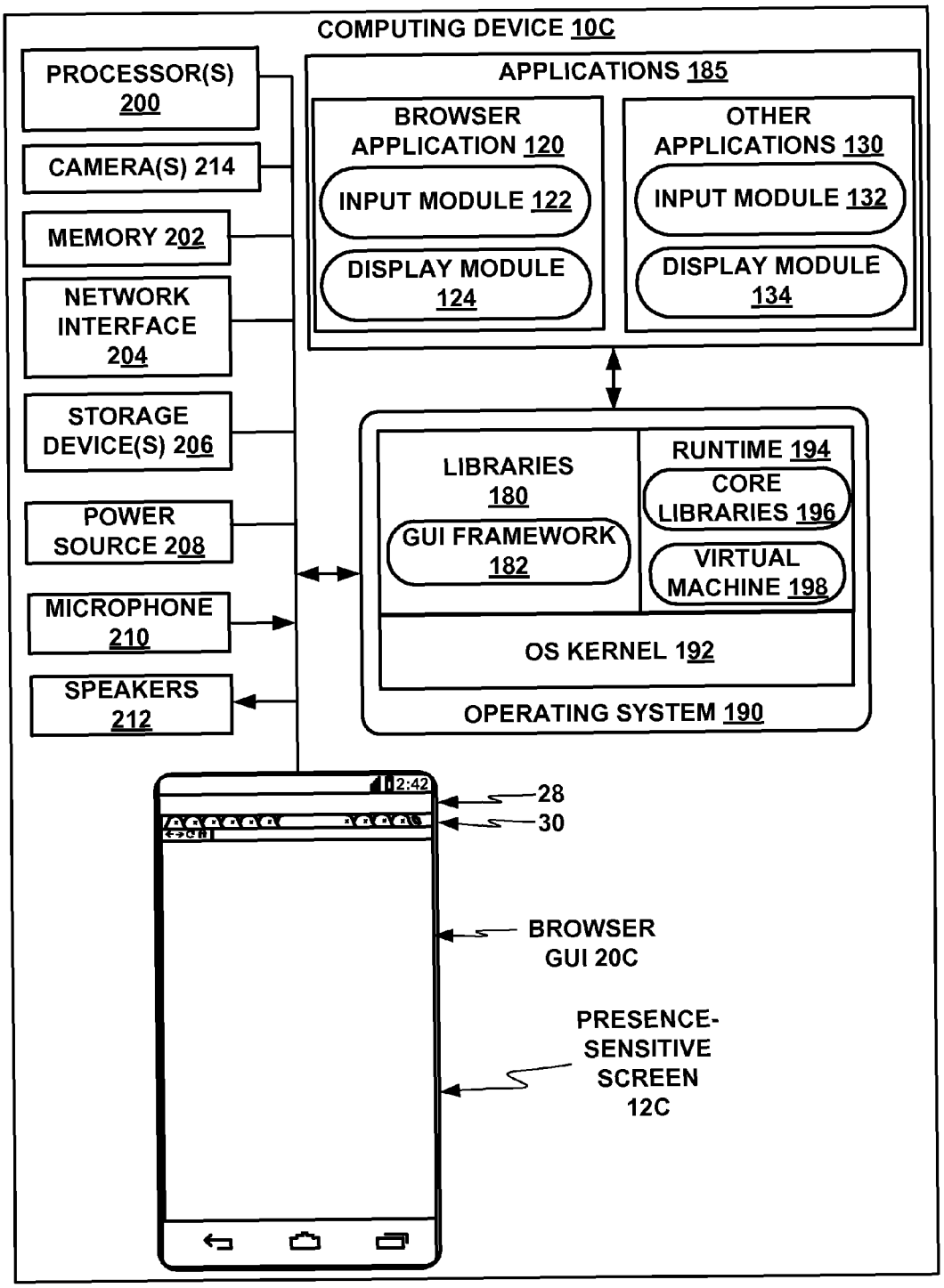
FIG. 8 is a schematic diagram illustrating an example smartphone or tablet computing device configured with additional example GUI navigation features in accordance with aspects of the present disclosure.

FIG. 8 is a block diagram illustrating further details of an example computing device 10C, as an example of the basic internal structure and function that may correspond to smartphone computing device 10 or tablet computing device 10B of FIGS. 1-7. Computing device 10C has a presence-sensitive screen 12C, and a browser application 120 that renders browser GUI 20C on presence-sensitive screen 12C, in accordance with aspects of this disclosure. Presence-sensitive screen 12C and browser GUI 20C are depicted as part of the block diagram format of FIG. 8 and are not intended to represent actual physical orientation or proportion in relation to the other depicted elements or computing device 10C as a whole. Various aspects of computing device 10C as shown in FIG. 8 may be similarly applicable to various others of smartphone computing device 10 and tablet computing device 10B as shown in FIGS. 1-7, while other examples of smartphone computing device 10 and tablet computing device 10B may have significant variations or differences compared with the features depicted in FIG. 8. For example, computing device 10C may also be implemented as a wearable computing device, a laptop computer, a desktop computer, a gaming console or gaming accessory, a television or television accessory, or other examples.

As shown in the example of FIG. 8, computing device 10C includes one or more processors 200, memory 202, a network interface 204, one or more data storage devices 206, power source 208, one or more microphones 210, one or more speakers 212, one or more cameras 214, and presence-sensitive screen 12C, which may be a touchscreen or other presence-sensitive screen as described above with reference to computing devices 10 and 10B. Computing device 10C also includes operating system 190 that may be stored on one or more storage devices 206 and execute on one or more processors 200. Each of the components 200, 202, 204, 206, 208, 210, 212, 214, 12C, and 190 may be interconnected (physically, communicatively, and/or operatively) in any of a variety of physical and/or communicative connection means for inter-component communications.

Operating system 190, in various examples, may control the operation of components of computing device 10C, and facilitate operation of higher-level software applications. Computing device 10C, in this example, further includes applications 185 including browser application 120 that is executable by computing device 10C. Operating system 190, in one example, facilitates the interaction of browser application 120 with any or all of processors 200, memory 202, network interface 204, data storage device 206, power source 208, one or more microphones 210, one or more speakers 212, one or more cameras 214, and presence-sensitive screen 12C.

As shown in FIG. 8, browser application 120 may include input module 122 and display module 124. Browser application 120, input module 122, and display module 124 may each include program instructions and/or data that are executable by computing device 10C or by at least one of the one or more processors 200 of computing device 10C. For example, application 120, input module 122, and/or display module 124 may include computer-executable software instructions that cause computing device 10C to perform any one or more of the operations and actions described in the present disclosure. In various examples, operating system 190 and browser application 120 may include code and/or data that are stored on one or more data storage devices 206 and that are read and executed or processed by one or more processors 200, and may in the process be stored at least temporarily in memory 202.

In this illustrative implementation of computing device 10C, operating system 190 may include an operating system kernel 192, which may include various device drivers, kernel extensions, and kernel modules, for example. Operating system 190 may also interact with a set of libraries 180, which may include various more or less standard, specialized, and/or proprietary libraries, such as a GUI framework 182, which may implement various basic functions for controlling the content displayed on presence-sensitive screen 12C, including content for browser GUI 20C provided by browser application 120, such as tab bar 30 and slide bar 28 in accordance with any of the examples described above. Applications 185 may also include other applications 130 with an input module 132 and display module 134 that may also include code for rendering tabbed page browsing or tabbed window browsing among multiple application processes, alone or in combination with browser application 120. Other applications 130 may also include their own code for rendering tab bar 30 and slide bar 28 in accordance with any of the examples described above.

In one illustrative implementation of computing device 10C, operating system 190 may also interact with a runtime 194, which may include various core libraries 196 as well as a virtual machine 198, which may be the Dalvik virtual machine in one example implementation. Virtual machine 198 may abstract certain aspects and properties of computing device 10C and allow higher-level applications to run on top of virtual machine 198, so that software code in the higher-level applications may be compiled into bytecode to be executed by the virtual machine 198. Other embodiments may include other elements of a software stack between the operating system kernel and the applications.

For example, software for applications such as browser application 120 may be written in C or C++, which may be executable as native code by computing device 10C, or may also be written in Java, then compiled to virtual-machine-executable bytecode to be executed by virtual machine 198. As one illustrative example, libraries 180 may include the Standard C Library (libc), which provides native support for C functions. In different implementations, the operating system 190 and/or the virtual machine 198 may be able to execute code written in various other languages such as Objective-C, Go, Python, Ruby, JavaScript, Dart, Clojure, or ClojureScript, for example, either natively, or compiled into a virtual machine-executable bytecode, or compiled into an assembly language or machine code native to the CPU of computing device 10C, for example. Various examples may not use a virtual machine, and use applications that run natively on the computing device 10C or that use some other technique, compiler, interpreter, or abstraction layer for interpreting a higher-level language into code that runs natively on computing device 10C.

GUI framework 182, libraries 180, or other aspect of operating system 190 or the software stack underlying the applications 185 may include code for providing any or all of the functionality for rendering tab bar 30 and/or slide bar 28 in accordance with any of the examples described above, and may abstract this functionality at an underlying level for applications 185. Code for implementing the functionality of any of the aspects of this disclosure may therefore be included in any level or portion of the entire software stack running on computing device 10C, or that is accessible to computing device 10C, such as in a web application or other program executing off of computing device 10C but that interacts with computing device 10C, such as via HTTP over a wireless connection.

In various examples, computing device 10C may also have various application programming interfaces (APIs) that are native to operating system 190 and that run on top of operating system 190, and which are intended to provide resources that automate or facilitate higher-level applications that access the one or more APIs. These one or more APIs may include object libraries or other libraries, toolsets, or frameworks, and may be associated with a native programming environment for writing applications. Computing device 10C may also have a different specific organization of APIs, libraries, frameworks, runtime, and/or virtual machine associated with or built on top of operating system 190 other than the example organization depicted in FIG. 8.

Higher level applications, such as browser application 120, may therefore make use of any of various abstractions, properties, libraries, or lower-level functions that are provided by any of operating system 190, OS kernel 192, libraries 180, GUI framework 182, runtime 194, core libraries 196, virtual machine 198, or other compilers, interpreters, frameworks, APIs, or other types of resources, or any combination of the above, with which computing device 10C is configured, to enable functions such as rendering a slide bar adjacent to or superimposed on a tab bar, URL box, or other graphical navigation element, dynamically magnifying and demagnifying tabs or other graphical navigation elements in response to user inputs, and other functions as described above.

The one or more processors 200, in various examples, may be configured to implement functionality and/or process instructions for execution within computing device 10C. For example, processors 200 may be capable of processing instructions stored in memory 202 or instructions stored on data storage devices 206. Computing device 10C may include multiple processors, and may divide certain tasks among different processors. For example, processors 200 may include a central processing unit (CPU), which may have one or more processing cores. Processors 200 may also include one or more graphics processing units (GPUs), and/or additional processors. Processors 200 may be configured for multi-threaded processing. Processors 200 and/or operating system 190 may divide tasks among different processors or processor cores according to certain criteria, such as to optimize graphics rendering or to optimize the user experience. For example, processors 200 and/or operating system 190 may reserve a particular processing thread or processor or processing core, or a portion thereof, for certain tasks such as rendering translational motion of graphical elements, or for rendering still images or video frames within a video output, such as video feeds and other graphical elements displayed in client GUI 20C.

Various tasks or portions of tasks may also be divided among different layers of software and hardware. For example, a processing thread may oversee higher-level management of the display of browser GUI 20C, while being configured to push much of the processing burden of decoding and rendering the graphics for browser GUI 20C through GPU hardware that is optimized for the task.

Memory 202, in various examples, may be configured to store information within computing device 10C during operation. Memory 202, in various examples, may be a computer-readable storage medium. In various examples, memory 202 is a temporary memory, and computing device 10C relies more on one or more data storage devices 206 than memory 202 for long-term storage. Memory 202, in various examples, may be a volatile memory, meaning that memory 202 may not maintain stored contents for a long duration of time once it is powered down, such as when computing device 10C is turned off. Examples of volatile memories that may characterize memory 202 include random access memories (RAM), dynamic random access memories (DRAM), static random access memories (SRAM), and other forms of volatile memories. In various examples, memory 202 may be used to store program instructions for execution by processors 200. Memory 202, in various examples, may be used by software or applications running on computing device 10C to temporarily store data and/or software code during execution of an application.

One or more data storage devices 206, in various examples, may include a computer-readable storage medium or multiple computer-readable storage media. Data storage devices 206 may be configured to store larger amounts of information than memory 202. Data storage devices 206 may further be configured for long-term storage of information. In various examples, data storage devices 206 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In other examples, memory 202 may also be configured for long-term data storage, and any of a variety of technologies may blur the lines between memory and data storage and between volatile and non-volatile. Memory 202 and data storage devices 206 may also include any of various caches, buffers, and other temporary memories that may be incorporated at any of various levels of a processing architecture and with various latency and capacity profiles, including a dedicated cache exclusive to a processing core or processing chip.

Computing device 10C, in various examples, may also include a network interface 204. Computing device 10C, in one example, utilizes network interface 204 to communicate with external devices, such as servers or data centers, via one or more networks, which may include one or more wireless networks. Network interface 204 may be or include a network interface card, such as an Ethernet card, an optical transceiver, a radio frequency transceiver, or any other type of component that is configured to send and receive information. Other examples of such network interfaces may include Bluetooth®, 3G, 4G, LTE, and WiFi® radios configured for mobile computing devices, as well as USB. In various examples, computing device 10C may use network interface 204 to communicate wirelessly with an external device such as a server or data center that may provide data for one or more browser windows in browser GUI 20C.

Computing device 10C, in various examples, may also include one or more input and/or output devices such as presence-sensitive screen 12C, which may be configured to display browser GUI 20C. Presence-sensitive screen 12C may include a liquid crystal display (LCD) display screen or display screen that uses another type of graphical output technology. Presence-sensitive screen 12C may also be a touchscreen, that comprises an electrically capacitive layer sensitive to the presence of touch and configured to translate the positions of touch gesture inputs, and the motions of touch gesture inputs as they change position over time, into signals to provide to a driver for the touchscreen or other feature for receiving the information on the gesture inputs, in the example of computing device 10C. Presence-sensitive screen 12C may also be another type of presence-sensitive screen in other examples.

Computing device 10C may also include or be configured to connect with any of a variety of other input and/or output devices such as physical buttons, a physical keyboard, a mouse, a touchpad, a trackball, a voice user interface system, an accelerometer, a vibration component, a sound card, a video graphics adapter card, or any other type of device for detecting and/or interpreting inputs from a user or for converting a signal into a form of graphical, audio, tactile, or other form of user output that can be sensed by a user.

Computing device 10C, in various examples, may include one or more power sources 208, which may be rechargeable and provide power to computing device 10C. Power source 208, in various examples, may be a lithium-ion battery, a nickel-cadmium battery, a nickel-metal hydride battery, or other suitable power source.

In various examples, all of or portions of browser application 120, input module 122, or display module 124 may be a part of or native to operating system 190, libraries 180, and/or runtime 194. In various examples, browser application 120 may receive input through network interface 204 of computing device 10C. Computing device 10C may, for example, receive website data and/or web application data through network interface 204 from a network-connected server device, and browser application 120 may use this data in the content it renders in browser GUI 20C. While certain features are displayed in the examples of browser GUI 20C as depicted in FIG. 8 and as described above, other examples of a browser GUI 20C or other GUI for a browser application 120 or other application 130 of the present disclosure may include more, fewer, or other variations of features than the examples discussed above, either in accordance with user-selected options, by default, or by implementation.

Figure 9:
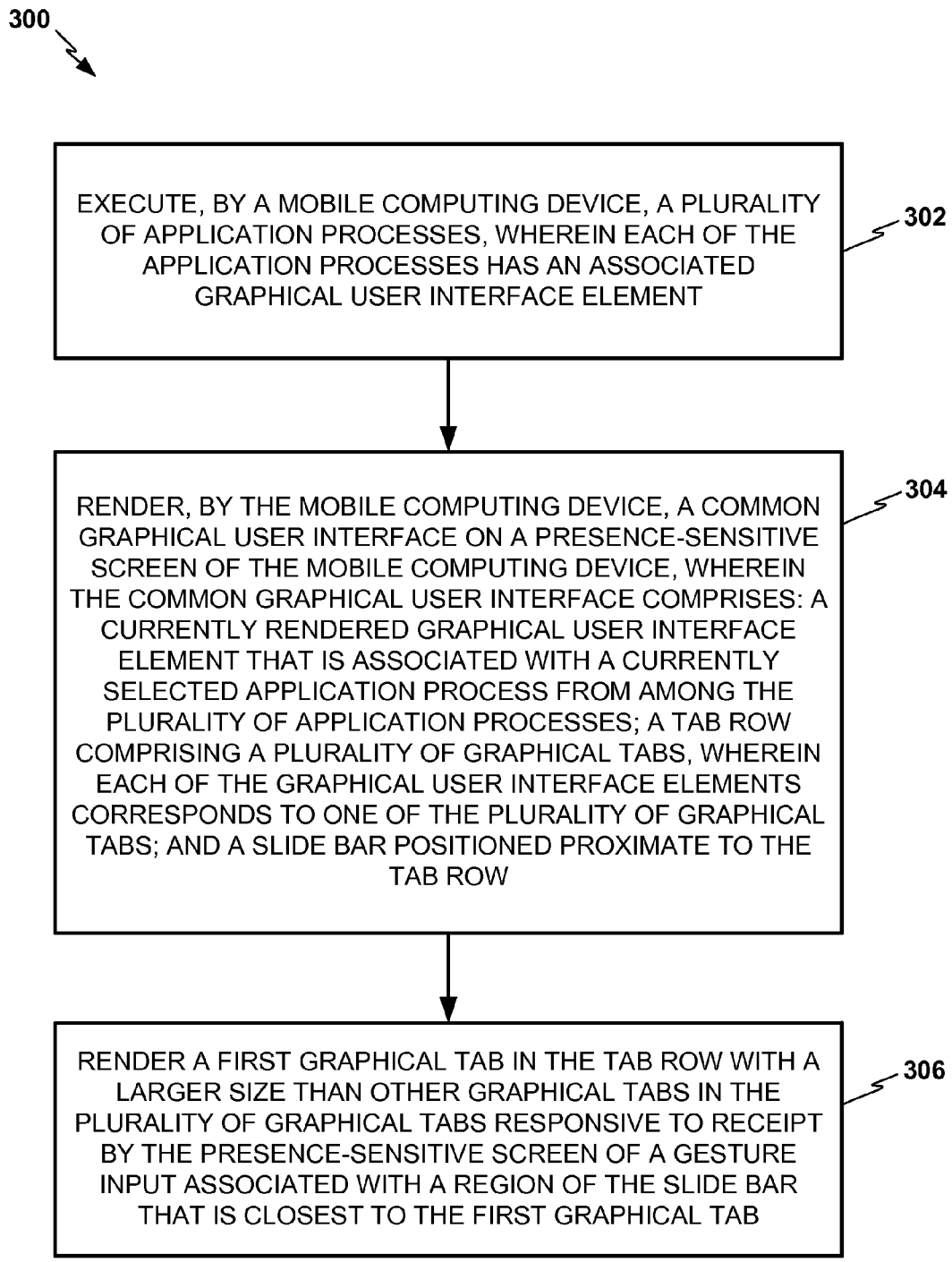
FIG. 9 is a flow diagram illustrating an example process that may be performed by a computing device to implement GUI navigation features in accordance with aspects of the present disclosure.

FIG. 9 is a flow diagram illustrating an example process 300 or method that may be performed by or be embodied in a computing device, such as smartphone computing device 10 of FIGS. 1-6, tablet computing device 10B of FIG. 7, computing device 10C of FIG. 8, and/or any one or more processors thereof, to implement a dynamic GUI for navigating among tabbed GUI windows, in accordance with any of the examples described above. Process 300 is only one example, and other implementations may include more or fewer aspects than those depicted in FIG. 9.

In process 300, a computing device or a processor thereof may execute a GUI application, such as browser application 120. In this example, a computing device executes a plurality of execution processes, such as tabbed browsing windows or other tabbed GUI windows, wherein each of the application processes has an associated process graphical user interface element (302). The computing device renders a common graphical user interface on a presence-sensitive screen of the computing device, wherein the common graphical user interface comprises a currently rendered process graphical user interface element that is associated with a currently selected application process from among the plurality of application processes; a tab row comprising a plurality of graphical tabs, wherein each of the process graphical user interface elements corresponds to one of the plurality of graphical tabs; and a slide bar positioned proximate to the tab row (304). The computing device renders a first graphical tab in the tab row with a larger size than other graphical tabs in the plurality of graphical tabs when the presence-sensitive screen receives a gesture input associated with a region of the slide bar that is closest to the first graphical tab (306). The computing device may further perform any of the functions and processes described above with reference to FIGS. 1-8.

Various techniques described herein may be implemented in software that may be written in any of a variety of languages, making use of any of a variety of toolsets, frameworks, APIs, programming environments, virtual machines, libraries, and other computing resources, as indicated above. For example, software code may be written in Java, C, Objective-C, C++, Go, Python, Ruby, Scala, Clojure, JavaScript, ClojureScript, assembly language, machine code, or any other language. As one specific illustrative example, aspects of the disclosure discussed above may be implemented in a software module written in Java that is executable on virtual machine 198 of FIG. 8, which may be the Dalvik virtual machine, for example.

Aspects of the disclosure may be equally applicable and implemented in any browser or operating system, and using any other APIs, frameworks, or toolsets. Aspects described herein for transmission, decoding, and rendering of data for video output or video content, which may be considered interchangeably herein with media output or media content that also includes audio output or audio content, may make use of any protocol, standard, format, codec, compression format, HTML element, or other technique or scheme for encoding, processing, decoding, rendering, or displaying an audio output or a video output.

When implemented in software or firmware, various techniques disclosed herein may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In various examples, an article of manufacture may comprise one or more computer-readable storage media.

In various examples, the data storage devices and/or memory may comprise computer-readable storage media that may comprise non-transitory media. The term "non-transitory" may indicate that the storage medium is not embodied in a carrier wave or a propagated signal. In certain examples, a non-transitory storage medium may store data that can, over time, change (e.g., in RAM or cache). Data storage devices may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format. Machine-readable code may be stored on the data storage devices and/or memory, and may include executable instructions that are executable by at least one processor. "Machine-readable code" and "executable instructions" may refer to any form of software code, including machine code, assembly instructions or assembly language, bytecode, software code in C, or software code written in any higher-level programming language that may be compiled or interpreted into executable instructions that may be executable by at least one processor, including software code written in languages that treat code as data to be processed, or that enable code to manipulate or generate code.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The various embodiments described above and depicted in FIGS. 1-9, as well as additional embodiments, are within the scope of one or more of the following claims.

What is claimed is:

1. A method comprising:
    executing, by a mobile computing device, a plurality of application processes, wherein each of the plurality of application processes has an associated graphical user interface element;
    outputting, by the mobile computing device and for display, a common graphical user interface, wherein the common graphical user interface comprises:
        a currently rendered graphical user interface element that is associated with a currently selected application process from among the plurality of application processes;
        a tab row comprising a plurality of graphical tabs, wherein each of the plurality of graphical tabs corresponds to one graphical user interface element that is associated with a respective one of the plurality of application processes; and
        a slide bar positioned proximate to the tab row, wherein the slide bar comprises a plurality of tab edge lines, wherein each of the plurality of tab edge lines indicates an edge of at least one of the plurality of graphical tabs;
    responsive to receipt of an indication of a gesture input associated with a region of the slide bar that is closer to a first graphical tab in the tab row than to other graphical tabs in the plurality of graphical tabs;
    outputting, by the mobile computing device and for display, the first graphical tab with a larger size than the other graphical tabs in the plurality of graphical tabs; and
    outputting, by the mobile computing device and for display, a change to a spacing between two tab edge lines of the plurality of tab edge lines that indicate respective edges of the first graphical tab, such that the positions of the respective edges indicated by the plurality of tab edge lines stay between adjacent tabs in the plurality of graphical tabs.

2. The method of claim 1, wherein the application processes comprise web browser application processes.

3. The method of claim 1, wherein the application processes comprise application processes associated with two or more mobile applications.

4. The method of claim 1, wherein, responsive to lack of receipt of the indication of the gesture input associated with the region of the slide bar, outputting a graphical tab for the currently rendered graphical user interface element with a larger size than graphical tabs other than the graphical tab in the plurality of graphical tabs.

5. The method of claim 1, wherein the larger size comprises a greater width.

6. The method of claim 1, further comprising outputting, in an intermediate size smaller than the larger size, each of a group of graphical tabs in the plurality of graphical tabs, wherein each of the group of graphical tabs are adjacent to the first graphical tab in the tab row, and wherein the intermediate size is larger than a size of graphical tabs that are not adjacent to the first graphical tab.

7. The method of claim 6, further comprising outputting the first graphical tab and the group of graphical tabs in a variable range of sizes, based at least in part on a relative position of the region of the slide bar.

8. The method of claim 7, further comprising outputting the first graphical tab in a size that decreases continuously responsive to receipt of an indication of the gesture input moving toward a region associated with an edge of the first graphical tab rendered with the larger size.

9. The method of claim 7, further comprising outputting a graphical tab of the group of graphical tabs in a size that increases continuously responsive to receipt of an indication of the gesture input moving closer to a region associated with the graphical tab of the group of graphical tabs.

10. The method of claim 7, wherein responsive to receipt of an indication the gesture input associated with a region that is closer to a second graphical tab in the tab row than to the first graphical tab, outputting the second graphical tab with a size that is larger than the first graphical tab.

11. The method of claim 1, further comprising alternating between:
outputting the plurality of graphical tabs in the tab row while maintaining the plurality of graphical tabs within a width of a presence-sensitive screen; and
outputting the tab row to extend off the presence-sensitive screen, based at least in part on a number of graphical tabs of the tab row that fit within the width of the presence-sensitive screen.

12. The method of claim 1, further comprising:
receiving an indication of a user selection of a first graphical tab; and
outputting a graphical user interface element that corresponds to the first graphical tab.

13. A mobile computing device, comprising:
at least one processor;
at least one data storage device; and
machine-readable code stored on the at least one data storage device, the machine-readable code comprising executable instructions that are executable by the at least one processor to:
execute a plurality of application processes, wherein each of the plurality of application processes has an associated graphical user interface element;
output a common graphical user interface for display, wherein the common graphical user interface comprises:
a currently rendered graphical user interface element that is associated with a currently selected application process from among the plurality of application processes;
a tab row comprising a plurality of graphical tabs, wherein each of the plurality of graphical tabs corresponds to one graphical user interface element that is associated with a respective one of the plurality of application processes; and
a slide bar positioned proximate to the tab row, wherein the slide bar comprises a plurality of tab edge lines, wherein each of the plurality of tab edge lines indicates an edge of at least one of the plurality of graphical tabs;
responsive to receipt of an indication of a gesture input associated with a region of the slide bar that is closer to a first graphical tab in the tab row than to other graphical tabs in the plurality of graphical tabs in the tab row;
output for display the first graphical tab in the tab row with a larger size than the other graphical tabs in the plurality of graphical tabs responsive to receipt, and
output for display a change to a spacing between two tab edge lines of the plurality of tab edge lines that indicate respective edges of the first graphical tab, such that the positions of the respective edges indicated by the plurality of tab edge lines stay between adjacent tabs in the plurality of graphical tabs.

14. The computing device of claim 13, wherein the executable instructions are further executable by the at least one processor to output, in an intermediate size smaller than the larger size, each of a group of graphical tabs in the plurality of graphical tabs, wherein each of the group of graphical tabs are adjacent to the first graphical tab in the tab row, and wherein the intermediate size is larger than a size of graphical tabs that are not adjacent to the first graphical tab.

15. A non-transitory computer-readable storage device comprising executable instructions for causing at least one processor to:
execute a plurality of application processes, wherein each of the plurality of application processes has an associated graphical user interface element;
output a common graphical user interface for display by a mobile computing device, wherein the common graphical user interface comprises:
a currently rendered graphical user interface element that is associated with a currently selected application process from among the plurality of application processes;
a tab row comprising a plurality of graphical tabs, wherein each of the plurality of graphical tabs corresponds to one graphical user interface element that is associated with a respective one of the plurality of application processes; and
a slide bar positioned proximate to the tab row, wherein the slide bar comprises a plurality of tab edge lines, wherein each of the plurality of tab edge lines indicates an edge of at least one of the plurality of graphical tabs;
responsive to receipt of an indication of a gesture input associated with a region of the slide bar that is closer to a first graphical tab in the tab row than to other graphical tabs in the plurality of graphical tabs in the tab row;

output for display the first graphical tab in the tab row with a larger size than the other graphical tabs in the plurality of graphical tabs responsive to receipt; and output for display a change to a spacing between two tab edge lines of the plurality of tab edge lines that indicate respective edges of the first graphical tab, such that the positions of the respective edges indicated by the plurality of tab edge lines stay between adjacent tabs in the plurality of graphical tabs.

16. The computer-readable storage device of claim 15, wherein the executable instructions further cause the at least one processor to output, in an intermediate size smaller than the larger size, each of a group of graphical tabs in the plurality of graphical tabs, wherein each of the group of graphical tabs are adjacent to the first graphical tab in the tab row, and wherein the intermediate size is larger than a size of graphical tabs that are not adjacent to the first graphical tab.

* * * * *